US011227567B2

(12) United States Patent
Kuya et al.

(10) Patent No.: US 11,227,567 B2
(45) Date of Patent: Jan. 18, 2022

(54) DEVICE STATE REPRODUCTION DEVICE, DEVICE STATE REPRODUCTION METHOD, AND STORAGE MEDIUM

(71) Applicant: Mitsubishi Electric Corporation, Tokyo (JP)

(72) Inventors: Ryo Kuya, Tokyo (JP); Koji Morita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/296,548

(22) PCT Filed: Jan. 28, 2019

(86) PCT No.: PCT/JP2019/002662
§ 371 (c)(1),
(2) Date: May 25, 2021

(87) PCT Pub. No.: WO2020/157790
PCT Pub. Date: Aug. 6, 2020

(65) Prior Publication Data
US 2021/0366437 A1    Nov. 25, 2021

(51) Int. Cl.
*G09G 5/14* (2006.01)
*G05B 19/41* (2006.01)
*G05B 19/418* (2006.01)

(52) U.S. Cl.
CPC ......... *G09G 5/14* (2013.01); *G05B 19/41835* (2013.01); *G05B 2219/31368* (2013.01)

(58) Field of Classification Search
None
See application file for complete search history.

(56) References Cited

U.S. PATENT DOCUMENTS

| 2011/0035693 | A1* | 2/2011 | Ueno | G05B 23/0272 |
| | | | | 715/771 |
| 2016/0246279 | A1* | 8/2016 | Amano | G05B 19/05 |

(Continued)

FOREIGN PATENT DOCUMENTS

| JP | 4-177402 A | 6/1992 |
| JP | 4-370806 A | 12/1992 |

(Continued)

OTHER PUBLICATIONS

International Search Report and Written Opinion dated Mar. 26, 2019, received for PCT Application PCT/JP2019/002662, Filed on Jan. 28, 2019, 6 pages including English Translation.

(Continued)

*Primary Examiner* — Tapas Mazumder
(74) *Attorney, Agent, or Firm* — Xsensus LLP

(57) ABSTRACT

A program display control unit performs a display process of displaying first time-series data corresponding to a specified time specified by a display time specification unit, on a first sequence program stored in a first device, which is displayed in a second display section, and another display process of displaying second time-series data acquired from a second device of multiple devices, corresponding to the specified time specified by the display time specification unit, on a second sequence program stored in the second device, which is displayed in a third display section.

11 Claims, 7 Drawing Sheets

(56) References Cited

U.S. PATENT DOCUMENTS

| | | | |
|---|---|---|---|
| 2017/0253122 A1* | 9/2017 | Jun | B60K 35/00 |
| 2018/0268588 A1* | 9/2018 | Shinohara | G16H 40/60 |
| 2019/0079500 A1* | 3/2019 | Nakano | G06F 9/52 |

FOREIGN PATENT DOCUMENTS

| | | |
|---|---|---|
| JP | 2007-213449 A | 8/2007 |
| JP | 2013-54636 A | 3/2013 |

OTHER PUBLICATIONS

Decision to Grant a Patent dated Sep. 3, 2019, received for JP Application 2019-535957, 5 pages including English Translation.

\* cited by examiner

DEVICE STATE REPRODUCTION DEVICE, DEVICE STATE REPRODUCTION METHOD, AND STORAGE MEDIUM

CROSS-REFERENCE TO RELATED APPLICATION

The present application is based on PCT filing PCT/JP2019/002662, filed Jan. 28, 2019, the entire contents of which are incorporated herein by reference.

FIELD

The present invention relates to a device state reproduction device, a device state reproduction method, and a device state reproduction program which are each capable of causing internal data of multiple control devices to be reflected in programs configured to cause the respective control devices to operate, so as to reproduce states of devices on the programs.

BACKGROUND

A factory automation (FA) system uses a production apparatus that provides control of a control target device with use of a programmable logic controller (PLC). Note that a programmable logic controller is also known as a programmable controller. When an abnormality occurs in a production apparatus, a response operation is performed to recognize the state of the PLC for the purpose of solving the abnormality. A typical operation for recognizing the state of the PLC is to display time-series data obtained during execution of the control of the control target device and stored in the PLC, on a waveform viewer to analyze the data.

Patent Literature 1 discloses a collected-data monitoring device designed to display waveforms corresponding to a sequence of time-series bit data sets relating to each of two or more variables collected from the PLC, on a screen in such a manner that the waveforms are arranged in multiple rows, and display an On time of an arbitrary On pulse or an Off time of an arbitrary Off pulse on the displayed waveforms.

CITATION LIST

Patent Literature

Patent Literature 1: Japanese Patent Application Laid-open No. 2007-213449

SUMMARY

Technical Problem

However, the collected-data monitoring device of Patent Literature 1 described above merely displays On and Off states of a signal at a cursor position pointed by a cursor based on the time-series data. For that reason, an operator needs to understand in advance how a sequence program works regarding why such a signal waveform was produced, and thereupon make an investigation of the waveform of a signal, thereby resulting in longer time therefor. This takes time.

In addition, the collected-data monitoring device of Patent Literature 1 described above is capable of displaying the On and Off states of multiple variables collected from a single PLC. However, when one production apparatus incorporates two or more PLCs, the operator cannot compare time-series data values of the PLCs at the same time to analyze them, thereby requiring much time for the operator to analyze the control status of the production apparatus.

The present invention has been made in view of the foregoing circumstances, and it is an object of the present invention to provide a device state reproduction device that can efficiently check each set of time-series data obtained during control of multiple control target devices.

Solution to Problem

To solve the above-mentioned problem and achieve the object, the present invention provides a device state reproduction device comprising: a time-series data storage unit to store, for each of two or more devices, two or more different sets of time-series data acquired from the devices, the time-series data being obtained during control of two or more different control target devices; a sequence program storage unit to store two or more sequence programs stored in the devices; a waveform display control unit to perform a first screen display process of displaying, in the first display section, a first screen that displays first time-series data acquired from a first device of the two or more devices, of the two or more different sets of time-series data, in a form of a waveform along with a time axis; a program display control unit to control display in the second display section and in the third display section; and a display time specification unit to specify a time at an arbitrary position in the waveform, wherein the program display control unit performs: a display process of displaying the first time-series data corresponding to a specified time specified by the display time specification unit, on a first sequence program stored by the first device, the first sequence program having been displayed in the second display section; and a display process of displaying second time-series data acquired from a second device of the two or more devices, corresponding to the specified time specified by the display time specification unit, on a second sequence program stored by the second device, the second sequence program having been displayed in the third display section.

Advantageous Effects of Invention

A device state reproduction device according to the present invention provides an advantageous effect of enabling efficient checking of each set of time-series data obtained during control of multiple control target devices.

DESCRIPTION OF EMBODIMENTS

A device state reproduction device, a device state reproduction method, and a device state reproduction program according to an embodiment of the present invention will be described in detail below with reference to the drawings. Note that this embodiment is not intended to necessarily limit the scope of this invention.

First Embodiment

Figure 1:
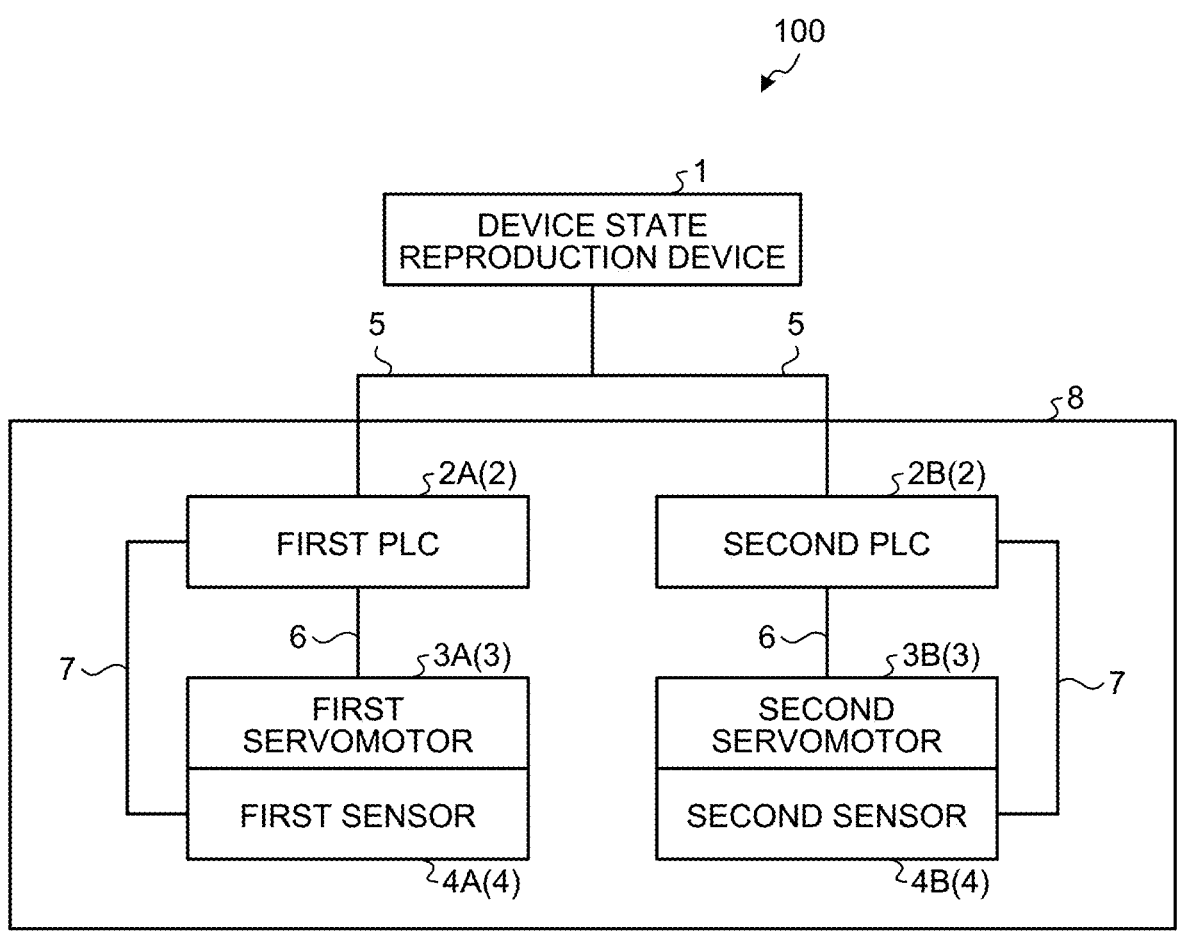
FIG. 1 is a block diagram illustrating a configuration of a device state reproduction system according to a first embodiment of the present invention.
Figure 2:
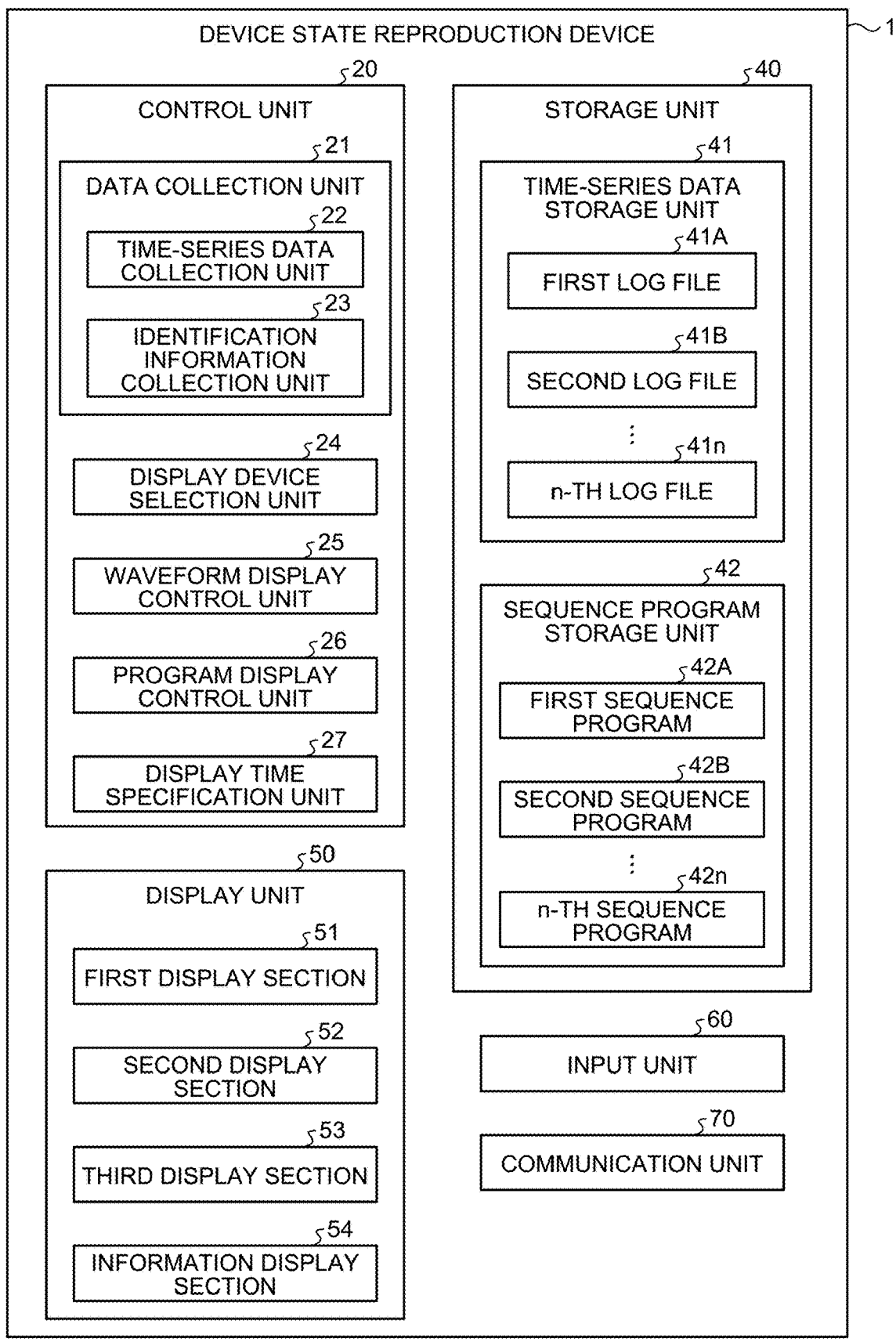
FIG. 2 is a block diagram illustrating a functional configuration of the device state reproduction device according to the first embodiment of the present invention.
Figure 3:
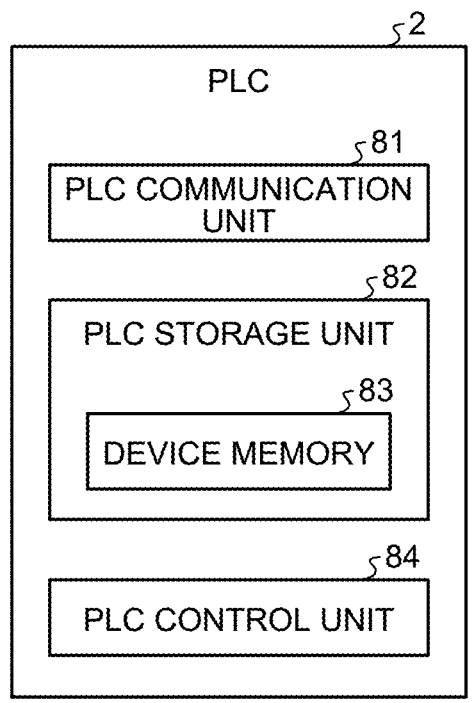
FIG. 3 is a block diagram illustrating a functional configuration of the programmable logic controller according to the first embodiment of the present invention.

FIG. 1 is a block diagram illustrating a configuration of a device state reproduction system 100 according to a first embodiment of the present invention. FIG. 2 is a block diagram illustrating a functional configuration of a device state reproduction device 1 according to the first embodiment of the present invention. FIG. 3 is a block diagram illustrating a functional configuration of a programmable logic controller 2 according to the first embodiment of the present invention. The device state reproduction system 100 is a system capable of reproducing, in the device state reproduction device 1, the state of control provided by a control device in an FA system. Considering that an "abnormality" in an FA system is typically referred to as "alarm", the term "abnormality" is represented as "alarm" also in this specification. Accordingly, analysis of the factor of occurrence of an alarm in this specification means analysis of the cause of occurrence of an abnormality.

The device state reproduction system 100 includes a device state reproduction device 1, a PLC 2, and a servomotor 3 equipped with a sensor 4.

In addition, the PLC 2, the servomotor 3, and the sensor 4 are installed in a single FA device 8.

Specifically, the FA device 8 has incorporated therein two or more servomotors 3 that are multiple control target devices, and two or more PLCs 2 that are control devices having a one-to-one correspondence to the servomotors 3.

Each of the PLCs 2 is a control device configured to control an operation of the servomotor 3 that is a control target device that drives a load device not illustrated. The PLC 2 collects and stores time-series data obtained during control of the control target device. The PLC 2 operates based on a programmable controller program. The programmable controller program includes a sequence program that is executed by the PLC 2 to control the operation of the servomotor 3, and a program for carrying out a control of the entire PLC 2. One of specific examples of the sequence program that is executed by the PLC 2 to control the operation of the servomotor 3 is a ladder program.

The PLC 2 is connected to the device state reproduction device 1 by means of a communication line 5, and can be in wired communication with the device state reproduction device 1. Note that the PLC 2 and the device state reproduction device 1 may communicate with each other wirelessly. The PLC 2 is also connected to the servomotor 3 by means of a communication line 6, and can be in communication with the servomotor 3. Note that the PLC 2 and the servomotor 3 may communicate with each other wirelessly.

The PLC 2 includes a PLC communication unit 81, a PLC storage unit 82, and a PLC control unit 84.

The PLC communication unit 81 communicates with the device state reproduction device 1 via the communication line 5 to transmit information to and receive information from the device 1. The PLC communication unit 81 also communicates with the servomotor 3 via the communication line 6 to transmit information to and receive information from the servomotor 3.

The PLC storage unit 82 stores the programmable controller program, information relating to a control of the PLC 2, and the like. The PLC storage unit 82 stores time-series data obtained during the control of the control target device. The PLC storage unit 82 stores a detection value of the sensor 4 obtained from the sensor 4 of the servomotor 3 controlled by the PLC 2, an intermediate value resulting from computation or processing of the detection value of the sensor 4, and a final value resulting from computation or processing of the detection value of the sensor 4. The detection value, the intermediate value, and the final value described above are various types of state data representing a control state obtained during the control of the servomotor 3 and held in the PLC storage unit 82, which correspond to time-series data representing an observation of a phenomenon changing over time. Examples of the state data include data representing a state of an operation of the servomotor 3, such as a position, a velocity, a torque, or the like in a situation where the servomotor 3 operates.

In addition, the PLC storage unit 82 includes a device memory 83. The device memory 83 is a memory configured to hold different types of device values each having a value that is updated according to an executed content when the PLC control unit 84 executes the sequence program. A device value corresponds to time-series data set representing a value of control information to be used by the PLC 2 to control the control target device, which is equal to a piece of data representing the state of the control target device. The device value is also a value having been stored in a component device. The term "component device" is a name for specifying an area in the device memory 83, which is an area in a shared memory of the PLC 2.

The PLC 2 transmits time-series data that is internal data stored in the PLC storage unit 82, to the device state reproduction device 1 periodically with a predetermined period. The time-series data includes the foregoing various types of state data and device values.

The device state reproduction system 100 includes a first PLC 2A and a second PLC 2B as the PLCs 2. The first PLC 2A controls the operation of a first servomotor 3A. The second PLC 2B controls the operation of a second servomotor 3B. Note that the first PLC 2A and the second PLC 2B are each referred to hereinafter as PLC 2 when no distinction needs to be made.

The device state reproduction system 100 includes the sensor 4 configured to detect the state of an operation of the servomotor 3 with a predetermined period, and transmits the detection result to the PLC 2. The sensor 4 communicates with the PLC 2 via the communication line 7 to transmit information to and receive information from the PLC 2. The device state reproduction system 100 includes a first sensor 4A and a second sensor 4B as the sensors 4. The first sensor 4A detects the state of the operation of the first servomotor 3A, and transmits the detection result to the first PLC 2A via the communication line 7. The second sensor 4B detects the state of the operation of the second servomotor 3B, and transmits the detection result to the second PLC 2B via the communication line 7. Note that the first sensor 4A and the second sensor 4B are each referred to as sensor 4 when no distinction needs to be made.

The device state reproduction device 1 communicates with the multiple PLCs 2 thereby to acquire the time-series data stored in the PLCs 2 from the PLCs 2. The device state reproduction device 1 causes the time-series data of each of the PLCs 2 obtained from the corresponding one of the PLCs 2 to be reflected in a sequence program identical to the sequence program stored in the corresponding one of the PLCs 2, thereby to reproduce, on the program, the state of the control target device in the PLC 2.

The device state reproduction device 1 includes a control unit 20, a storage unit 40, a display unit 50, an input unit 60, and a communication unit 70.

The control unit 20 provides overall control of the device state reproduction device 1. In addition, the control unit 20 includes a data collection unit 21, a display device selection unit 24, a waveform display control unit 25, a program display control unit 26, and a display time specification unit 27.

The storage unit 40 stores a program for performing overall control of the device state reproduction device 1, information relating to the control of the device state reproduction device 1, and some other data. The storage unit 40 is implemented using a non-volatile memory device to prevent loss of stored information even upon loss of electrical power to the device state reproduction device 1. In another respect, the storage unit 40 includes a time-series data storage unit 41 and a sequence program storage unit 42.

Figure 5:
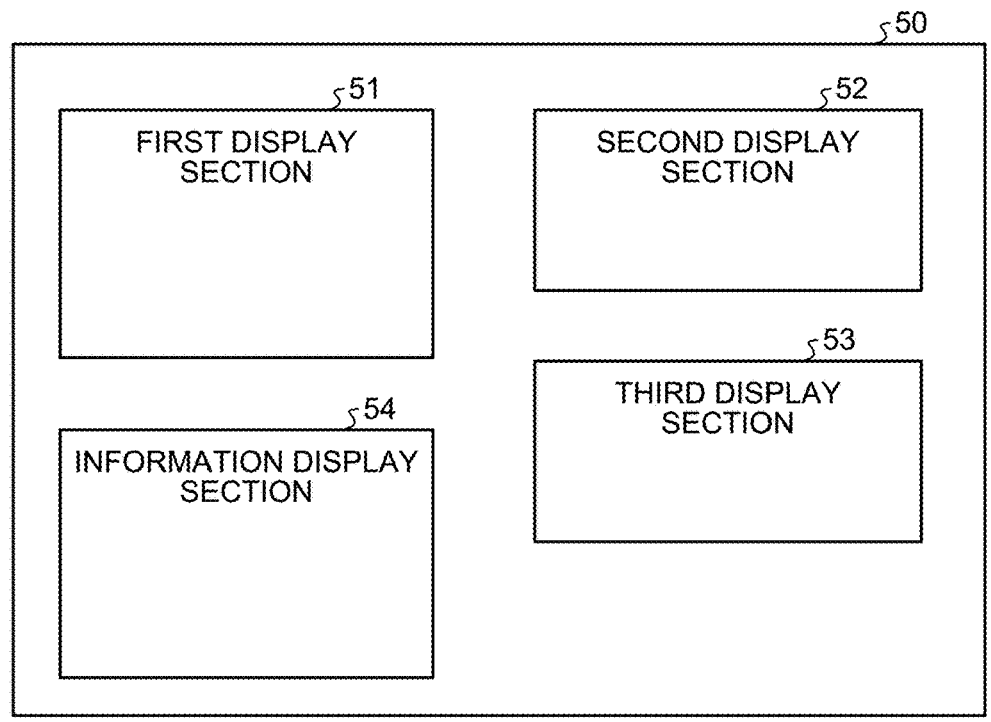
FIG. 5 is a schematic diagram illustrating an example of layout for a first display section, a second display section, a third display section, and an information display section which are provided in the display unit illustrated in FIG. 2.

The display unit 50 is a display terminal such as a liquid crystal display monitor, which displays internal data and the sequence programs obtained from the PLCs 2, instruction information inputted by the operator via the input unit 60, and the like. Screen display on the display unit 50 can be provided using publicly-known screen display processing. The display unit 50 includes a first display section 51, a second display section 52, a third display section 53, and an information display section 54. FIG. 5 is a schematic diagram illustrating an example of layout of the first display section 51, the second display section 52, the third display section 53, and the information display section 54 provided in the display unit 50 illustrated in FIG. 2.

Figure 6:
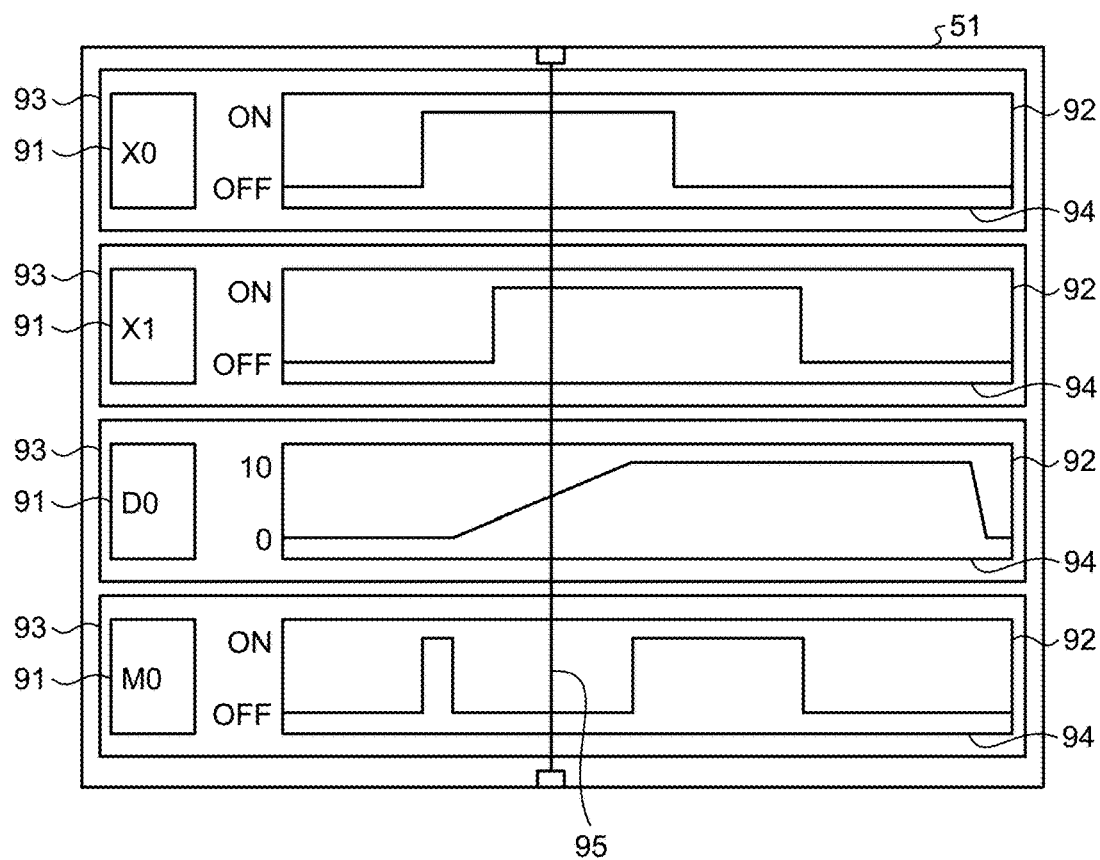
FIG. 6 is a schematic diagram illustrating an example of a display screen displayed in the first display section illustrated in FIG. 2, and is a diagram illustrating an example in which the time-series data is a device value.
Figure 7:
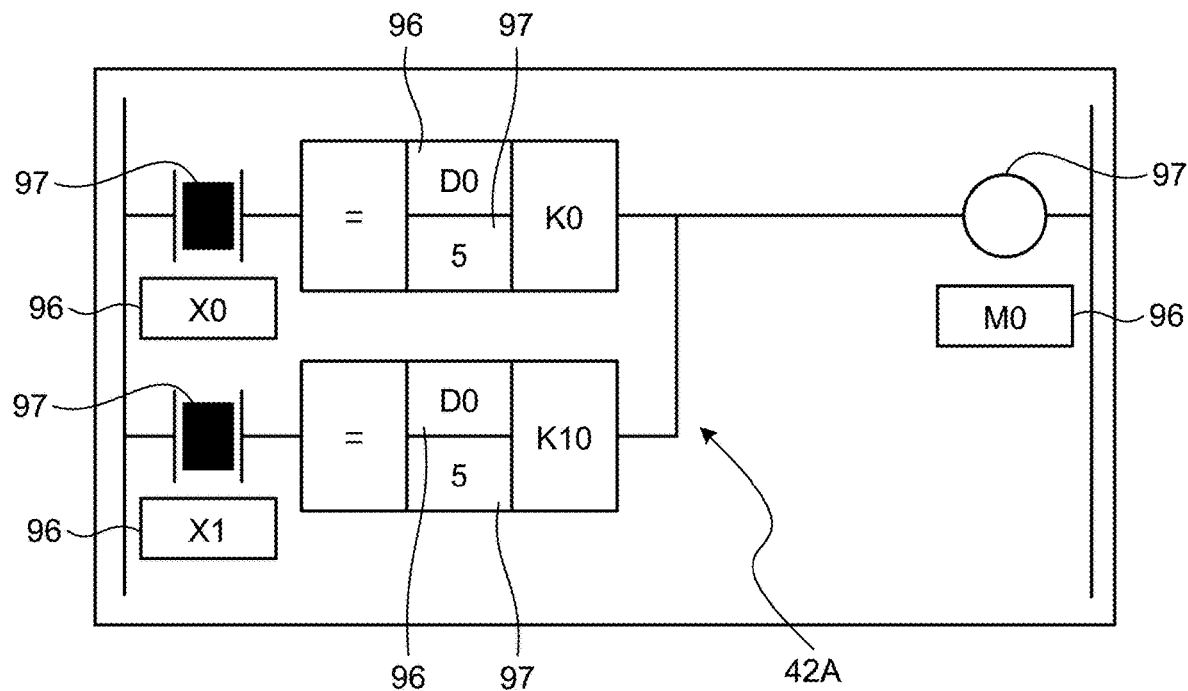
FIG. 7 is a schematic diagram illustrating an example of a display screen displayed in the second display section illustrated in FIG. 2, and is a diagram illustrating an example in which the time-series data is a device value.
Figure 8:
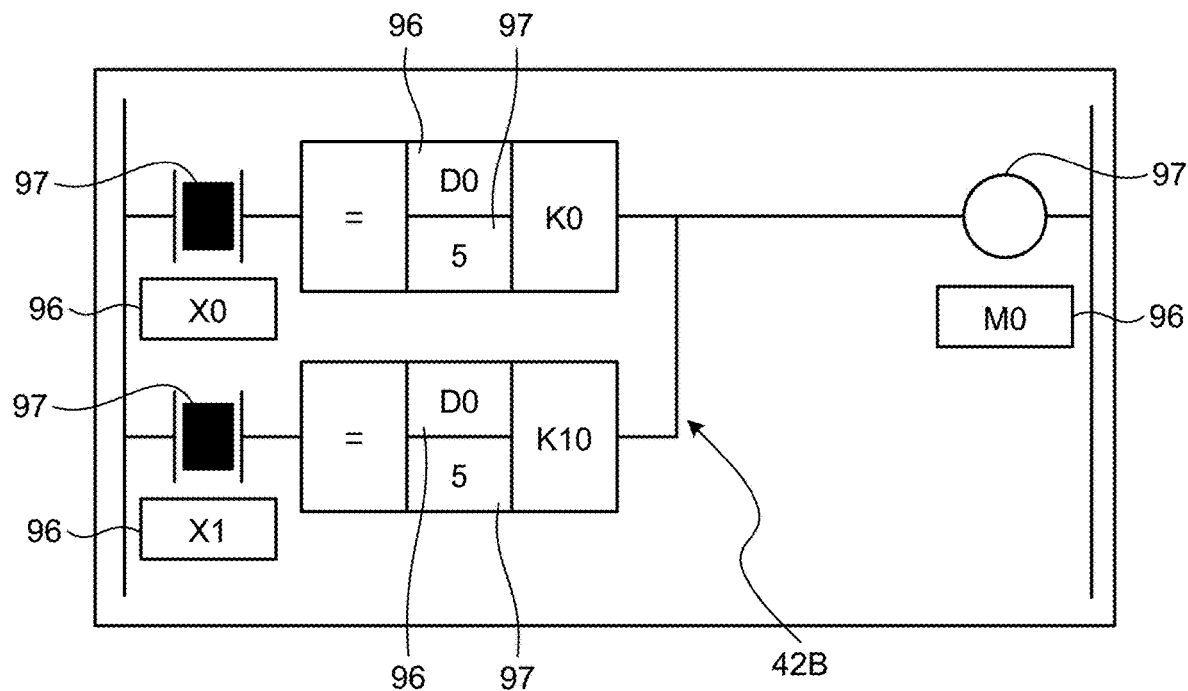
FIG. 8 is a schematic diagram illustrating an example of a display screen displayed in the third display section illustrated in FIG. 2, and is a diagram illustrating an example in which the time-series data is a device value.

FIG. 6 is a schematic diagram illustrating an example of a display screen displayed in the first display section 51 illustrated in FIG. 2, which corresponds to a diagram illustrating an example of a case in which time-series data 131 is a device value. FIG. 7 is a schematic diagram illustrating an example of a display screen displayed in the second display section 52 illustrated in FIG. 2, which corresponds to a diagram illustrating an example of a case in which the time-series data 131 is a device value. FIG. 8 is a schematic diagram illustrating an example of a display screen displayed in the third display section 53 illustrated in FIG. 2, which corresponds to a diagram illustrating an example of a case in which the time-series data 131 is a device value.

The data collection unit 21 of the control unit 20 acquires the time-series data 131 and identification information 132 from the PLC 2, generates a log file with the acquired time-series data 131 being associated with the acquired identification information 132, generates a log file based thereon, and stores the log file in the storage unit 40. The data collection unit 21 includes a time-series data collection unit 22 and an identification information collection unit 23.

The time-series data collection unit 22 of the data collection unit 21 acquires the internal data stored in the PLC storage unit 82 of each of the multiple PLCs 2 periodically with a predetermined period from the corresponding one of the multiple PLCs 2 via the communication unit 70. The internal data acquired by the time-series data collection unit 22 from the PLC 2 is the time-series data stored in the PLC storage unit 82 of the PLC 2, and includes various types of state data and device values.

The identification information collection unit 23 of the data collection unit 21 acquires the identification information 132 by which each of the PLCs 2 can be uniquely identified, from each of the multiple PLCs 2. The identification information collection unit 23 transmits the acquired identification information 132 to the time-series data collection unit 22. Examples of the identification information 132 include an Internet protocol (IP) address and a serial number specific to each of the PLCs 2.

The time-series data collection unit 22 generates a log file with the identification information 132 received from the identification information collection unit 23 being associated with the time-series data 131 transmitted from the PLC 2 corresponding to the identification information 132, and stores the log file in the time-series data storage unit 41 of the storage unit 40. The time-series data collection unit 22 generates a log file for each of the PLCs 2, and stores the log file in the time-series data storage unit 41 of the storage unit 40. In the log file, the time-series data 131 associated with the identification information 132 is stored for each PLC 2.

Figure 4:
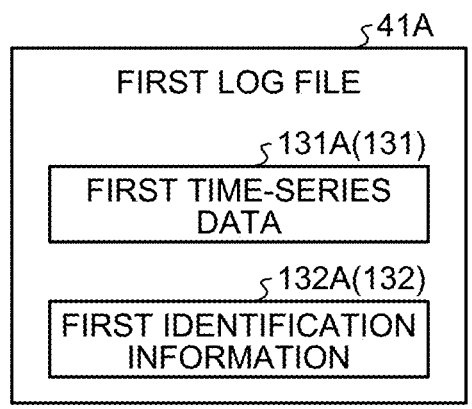
FIG. 4 is a diagram illustrating first time-series data and first identification information that is identification information of a first PLC, both stored in the first log file illustrated in FIG. 2.

FIG. 4 is a diagram illustrating first time-series data 131A and first identification information 132A that is the identification information of the first PLC 2A, both stored in the first log file 41A illustrated in FIG. 2. The time-series data collection unit 22 generates the first log file 41A with the first identification information 132A of the first PLC 2A being associated with the first time-series data 131A transmitted from the first PLC 2A, and stores the first log file 41A in the time-series data storage unit 41 of the storage unit 40. The time-series data collection unit 22 also generates a second log file 41B with second identification information 132B that is the identification information of the second PLC 2B being associated with second time-series data 131B transmitted from the second PLC 2B, and stores the second log file 41B in the time-series data storage unit 41 of the storage unit 40. In addition, as far as an n-th PLC 2n is concerned for example, the time-series data collection unit 22 associates n-th identification information 132n that is the identification information of the n-th PLC 2n with n-th time-series data 131n transmitted from the n-th PLC 2n to generate an n-th log file 41n, and stores the n-th log file 41n in the time-series data storage unit 41 of the storage unit 40.

The display device selection unit 24 of the control unit 20 selects PLCs 2 to be displayed in the first display section 51 and the second display section 52 and in the third display section 53 based on designation information inputted by the operator via the input unit 60. The display device selection unit 24 displays, in the information display section 54, a list of PLCs 2 whose log files are stored in the time-series data storage unit 41 to prompt the operator to specify PLCs 2 to be displayed in the first display section 51 and second display section 52 and in the third display section 53.

The display device selection unit 24 stores in advance correspondence information representing a correspondence relationship between the PLC 2 whose log file is stored in the time-series data storage unit 41 and the identification information 132 of the PLC 2 whose log file is stored in the time-series data storage unit 41. The display device selection unit 24 refers to the log files stored in the time-series data storage unit 41, for example, at an arbitrary timing, thereby making it possible to generate and store the correspondence information.

The input unit 60 receives first designation information inputted by the operator, the first designation information being intended to specify the PLC 2 that is to be displayed in the first display section 51 and the second display section 52. The input unit 60 transmits the inputted first designation information to the display device selection unit 24. The display device selection unit 24 selects the identification information 132 of the PLC 2 specified by the operator, based on the first designation information and the correspondence information. The display device selection unit 24 generates first selection information that is information including information indicating the PLC 2 specified by the operator and the identification information 132 of this PLC 2, and transmits the first selection information to the waveform display control unit 25 and the program display control unit 26.

The operator also inputs, to the input unit 60, second designation information for specifying the PLC 2 to be displayed in the third display section 53. The input unit 60 transmits the inputted second designation information to the display device selection unit 24. The display device selection unit 24 selects the identification information 132 of the PLC 2 specified by the operator, based on the second designation information and the correspondence information. The display device selection unit 24 generates second selection information that is information including information indicating the PLC 2 specified by the operator and the identification information 132 of this PLC 2, and transmits the second selection information to the program display control unit 26.

The waveform display control unit 25 of the control unit 20 selects the PLC 2 indicated by the first selection information as a first displayed PLC that is a display target PLC 2 whose time-series data is to be displayed in the first display section 51, based on the first selection information received from the display device selection unit 24. The waveform display control unit 25 acquires the time-series data 131 of the PLC 2 selected as the first displayed PLC from the time-series data storage unit 41 on the basis of the identification information included in the first selection information. The waveform display control unit 25 displays, in the first display section 51, a screen set for displaying the acquired time-series data 131 in the form of a waveform together with a time axis 94.

More specifically, the waveform display control unit 25 performs a first screen display process of displaying, in the first display section 51, a first screen set for displaying the time-series data stored in the time-series data storage unit 41 and acquired from the first displayed PLC of the multiple PLCs 2, in the form of a waveform, together with the time axis 94. Thus, the waveform display control unit 25 and the first display section 51 are capable of carrying out a function of a so-called waveform viewer. Then, the waveform display control unit 25 has a log data selection function of automatically selecting the time-series data 131 on the basis of the identification information included in the first selection information.

The program display control unit 26 of the control unit 20 selects the PLC 2 indicated by the first selection information as the first displayed PLC that is a display target PLC 2 whose sequence program is to be displayed in the second display section 52, based on the first selection information received from the display device selection unit 24. The program display control unit 26 acquires the sequence program of the PLC 2 selected as the first displayed PLC from the sequence program storage unit 42 on the basis of the identification information included in the first selection information. The program display control unit 26 displays a screen set for displaying the acquired sequence program in the second display section 52.

More specifically, the program display control unit 26 performs a second screen display process of displaying, in the second display section 52 that is a first program display section, a second screen set for displaying a first sequence program that is the sequence program stored in the sequence program storage unit 42 and stored in the first displayed PLC of the multiple PLCs 2. Then, the program display control unit 26 has a sequence program selection function of automatically selecting the sequence program on the basis of the identification information included in the first selection information.

The program display control unit 26 also selects the PLC 2 indicated by the second selection information as a second displayed PLC that is a display target PLC 2 whose sequence program is to be displayed in the third display section 53, based on the second selection information received from the display device selection unit 24. The program display control unit 26 acquires the sequence program of the PLC 2 selected as the second displayed PLC from the sequence program storage unit 42 on the basis of the identification information included in the second selection information. The program display control unit 26 displays a screen set for displaying the acquired sequence program in the third display section 53.

More specifically, the program display control unit 26 performs a third screen display process of displaying, in the third display section 53 that is a second program display section, a third screen set for displaying a second sequence program stored in the second displayed PLC, of the multiple sequence programs stored in the sequence program storage unit 42. Then, the program display control unit 26 has a sequence program selection function of automatically selecting the sequence program on the basis of the identification information included in the second selection information.

In addition, after displaying the sequence program in the second display section 52, the program display control unit 26 causes the value of the first time-series data corresponding to a specified time specified by the display time specification unit 27 to be reflected in the first sequence program displayed in the second display section 52. The program display control unit 26 acquires the time-series data 131 of the PLC 2 that has been selected based on the first selection information received from the display device selection unit 24, from the time-series data storage unit 41, based on the identification information included in the first selection information. The program display control unit 26 displays the value of the first time-series data corresponding to the specified time in the time-series data 131 acquired, on the first sequence program displayed in the second display section 52.

More specifically, the program display control unit 26 performs a fourth screen display process of displaying the first time-series data corresponding to the specified time specified by the display time specification unit 27, on the first sequence program corresponding to the specified time displayed in the second display section 52. Then, the program display control unit 26 has a log data selection function of automatically selecting the time-series data 131 on the basis of the identification information included in the first selection information.

In addition, after displaying the second sequence program in the third display section 53, the program display control unit 26 causes the value of the second time-series data corresponding to the specified time specified by the display time specification unit 27 to be reflected in the second sequence program that is currently displayed in the third display section 53. The program display control unit 26 acquires the time-series data 131 of the PLC 2 that has been selected based on the second selection information received from the display device selection unit 24, from the time-series data storage unit 41 on the basis of the identification information included in the second selection information. The program display control unit 26 displays the value of the second time-series data corresponding to the specified time in the acquired time-series data 131, on the second sequence program that is currently displayed in the third display section 53.

In other words, the program display control unit 26 performs a fifth screen display process of displaying the second time-series data corresponding to the specified time specified by the display time specification unit 27, on the second sequence program corresponding to the specified time displayed in the third display section 53. Then, the program display control unit 26 has a log data selection function of automatically selecting the time-series data 131 on the basis of the identification information included in the second selection information.

The program display control unit 26 repeats the fourth screen display process and the fifth screen display process each time the specified time is changed.

As described above, the program display control unit 26 performs: a display process of displaying the time-series data 131 acquired from the first displayed PLC of the multiple PLCs 2, corresponding to a specified time specified by the display time specification unit 27, on the first sequence program stored in the first displayed PLC, which is displayed in the second display section 52; and another display process of displaying the time-series data 131 acquired from the second displayed PLC of the multiple PLCs 2, corresponding to the specified time specified by the display time specification unit 27, on the second sequence program stored in the second displayed PLC, which is displayed in the third display section 53.

The display time specification unit 27 of the control unit 20 specifies a time at an arbitrary position on the waveform displayed in the first display section 51. For example, as illustrated in FIG. 6, a cursor 95 is displayed over device waveform display sections 92 in the first display section 51. The time axis 94 in each of the multiple device waveform display sections 92 described later represents a common time window. The cursor 95 crosses over the multiple device waveform display sections 92, and is allowed to specify one point in the direction of the time axis 94 in the multiple device waveform display sections 92. The display time specification unit 27 acquires the specified time specified by the cursor 95. The display time specification unit 27 transmits the information on the acquired specified time to the program display control unit 26.

Moving the cursor 95 along the direction of the time axis 94 allows the time at an arbitrary position on the waveform displayed in the device waveform display section 92 to be specified. The specified time is acquired by means of the cursor 95 in a publicly-known image displaying technique. In addition, scrolling the waveform displayed in the first display section 51 in the direction of the time axis 94 enables a time in a time window not displayed in the present first display section 51 to be specified.

The time-series data storage unit 41 of the storage unit 40 stores the log files generated by the data collection unit 21 acquiring the time-series data 131 and the identification information 132 from the multiple PLCs 2.

The sequence program storage unit 42 of the storage unit 40 stores sequence programs identical to the sequence programs stored in the multiple respective PLCs 2 connected to the device state reproduction device 1. The sequence program storage unit 42 stores a first sequence program 42A that is a sequence program identical to the sequence program stored in the first PLC 2A. The sequence program storage unit 42 stores a second sequence program 42B that is a sequence program identical to the sequence program stored in the second PLC 2B. The sequence program storage unit 42 also stores, for example, an n-th sequence program 42n that is a sequence program identical to the sequence program stored in the n-th PLC 2n. Note that the first sequence program 42A may be referred to hereinafter as first program 42A, and the second sequence program 42B may be referred to hereinafter as second program 42B.

The first display section 51 of the display unit 50 displays a screen set for displaying the time-series data 131 of the display target PLC 2 that has been selected based on the first selection information, in the form of a waveform along with the time axis 94.

Description will now be provided of an example of a display screen of the first display section 51 when the time-series data 131 is a device value, with reference to FIG. 6. The first display section 51 includes device display sections 93 each having a device name display section 91 in which a device name is displayed, and a device waveform display section 92 in which the waveform of a device value of the component device displayed in the device name display section 91 is displayed. The device display sections 93 are displayed on a per-device basis under control of the waveform display control unit 25. In addition, by switching the display of the first display section 51 to a next screen, it is possible to display different device name and device value waveform in the time-series data 131, the different device name and device value waveform being currently not displayed in the first display section 51. The time-series data 131 to be displayed in the device display section 93 is not limited, but may be bit data or may be analog data.

The first display section 51 is displayable in two or more rows along the time axis 94 in the same time window. This allows the waveforms of device values of multiple component devices to be simultaneously displayed, and thus enables changes in the device values of the component devices to be checked at the same time.

Although the foregoing description has been given for a case of displaying device values on the display unit 50, the time-series data 131 other than the device values may also be displayed in the first display section 51 similarly to the case described above. In this case, it is enough to display the name of the time-series data in the device name display section 91 in place of the device name, and to display the waveform of that time-series data in the device waveform display section 92.

The second display section 52 of the display unit 50 is a first program display section set for displaying a sequence program identical to the sequence program stored in the PLC 2 indicated in the first selection information. More specifically, the second display section 52 is a display section set for displaying a sequence program corresponding to the time-series data 131 in which the waveforms of device values is displayed in the first display section 51, which means a display section that displays the sequence program having been executed in the PLC 2 from which the time-series data 131 in which the waveform of device value is displayed in the first display section 51 has been obtained. The second display section 52 is capable of displaying a part of the sequence program at the specified time specified by the display time specification unit 27 and around that time.

Description will now be provided of an example of a display screen of the second display section 52 when the time-series data 131 is a device value, with reference to FIG. 7. The second display section 52 displays a ladder program that is an example of the first program 42A, resulting from the second screen display process of the program display control unit 26. The second display section 52 has device name display sections 96, each of which displays therein the device name described at the specified time in the first program 42A. The first program 42A also has device value display sections 97, each of which displays the value of the first time-series data 131A at the specified time, resulting from the fourth screen display process of the program display control unit 26. In addition, by switching the display of the second display section 52 to a next screen, it is possible to display another part of the first program 42A and the value corresponding thereto of the first time-series data 131A, the part and value being currently not displayed in the second display section 52.

The third display section 53 of the display unit 50 is a second program display section set for displaying a sequence program identical to the sequence program stored in the PLC 2 indicated by the second selection information, which has a configuration similar to that of the second display section 52. The third display section 53 displays a sequence program different from the sequence program displayed in the second display section 52. More specifically, the third display section 53 displays a sequence program that is currently used to control a control target device by a PLC 2 different from the PLC 2 controlling a control target device using the sequence program displayed in the second display section 52. The third display section 53 is capable of displaying a part of the sequence program at the specified time specified by the display time specification unit 27 and around that time.

Description will now be provided of an example of a display screen of the third display section 53 when the time-series data 131 is a device value, with reference to FIG. 8. In the third display section 53, a ladder program that is an example of the second program 42B is displayed, display of the ladder program resulting from the third screen display process of the program display control unit 26. In the device name display section 96 of the third display section 53, the device name described at the specified time in the second program 42B is displayed. In the device value display section 97 of the second program 42B, the value of the second time-series data at the specified time is displayed resulting from the fifth screen display process of the program display control unit 26. In addition, by switching the display of the third display section 53 to a next screen, it is possible to display another part of the second program 42B and the value of the second time-series data 131B, which are currently not displayed in the third display section 53.

The information display section 54 displays various types of information relating to the operation of the device state reproduction device 1.

The input unit 60 is configured to include an input device such as a mouse or a keyboard, which receives instruction information from the operator, and transmits the instruction information to the control unit 20.

The communication unit 70 communicates with the PLCs 2 via the communication line 5 to transmit and receive information.

Figure 9:
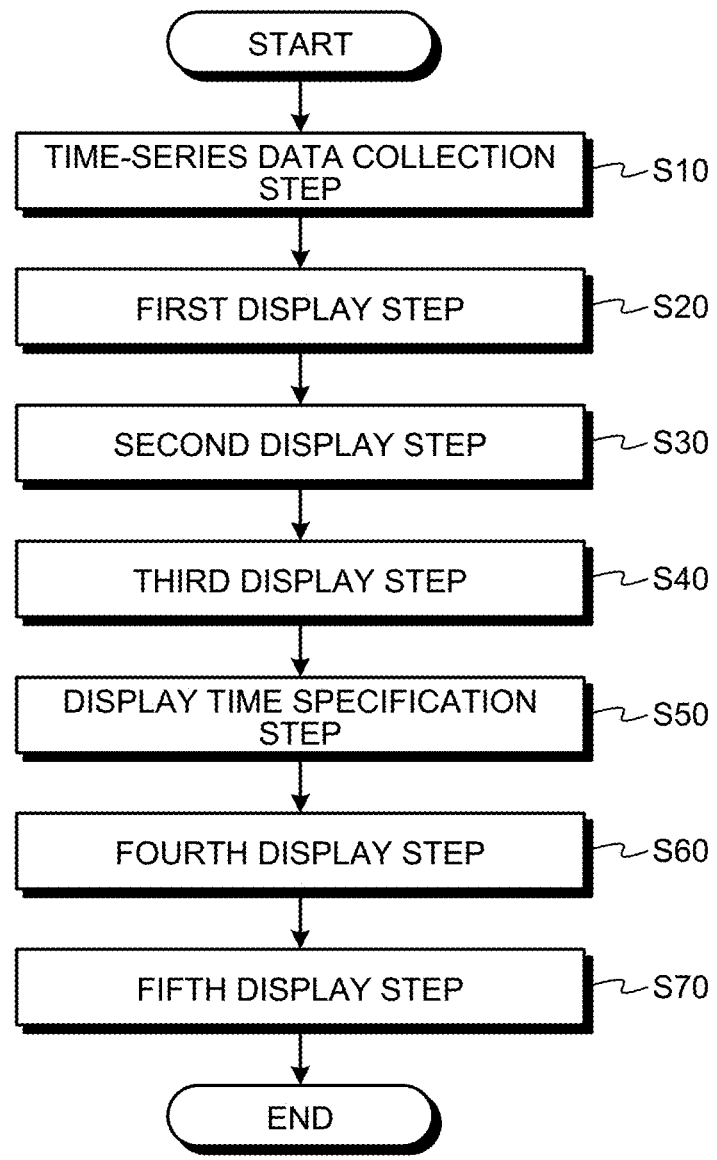
FIG. 9 is a flowchart illustrating a procedure of an operation of the device state reproduction device illustrated in FIG. 2.

An operation of the device state reproduction device 1 will next be described. FIG. 9 is a flowchart illustrating a procedure of an operation of the device state reproduction device 1 illustrated in FIG. 2.

First of all, at step S10, a time-series data collection step is performed. More specifically, the device state reproduction device 1 collects the time-series data stored in the PLCs 2 and periodically transmitted from the PLCs 2. The data collection unit 21 receives the time-series data 131 and the identification information 132 which are periodically transmitted from the PLCs 2, generates a log file with associating the acquired time-series data 131 with the acquired identification information 132, and stores the log file in the storage unit 40. The data collection unit 21 generates a log file for each of the different PLCs, and causes the storage unit 40 to store it therein. The time-series data is collected continually.

Next, at step S20, a first display step is performed, which is a first display section display step by which a first screen display process is performed. In the first display step, a first screen is displayed in the first display section 51, the first screen being set for displaying first time-series data acquired from a first displayed PLC of the multiple PLCs 2 in the form of a waveform along with the time axis 94.

That is, the waveform display control unit 25 selects the PLC 2 indicated by first selection information as the first displayed PLC that is a display target PLC 2 whose time-series data is displayed in the first display section 51, based on the first selection information transmitted from the display device selection unit 24 based on the operator's input of first designation information. The waveform display control unit 25 then acquires the time-series data 131 of the first displayed PLC from the time-series data storage unit 41 on the basis of the identification information included in the first selection information, and displays, in the first display section 51, the first screen that is set for displaying the time-series data 131 of the first displayed PLC in the form of a waveform along with the time axis 94.

Next, at step S30, a second display step is performed, which is a second display section display step by which a second screen display process is performed. In the second display step, a second screen is displayed in the second display section 52, the second screen being set for displaying a first sequence program stored in the first displayed PLC of the multiple PLCs 2.

That is, the program display control unit 26 selects the PLC 2 indicated by the first selection information as the first displayed PLC that is a display target PLC 2 whose sequence program is displayed in the second display section 52, based on the first selection information transmitted from the display device selection unit 24 based on the operator's input of the first designation information. For example, the first PLC 2A is selected as the first displayed PLC that is a display target whose sequence program is displayed in the second display section 52. The program display control unit 26 then acquires the first sequence program that is the sequence program of the first displayed PLC selected, from the sequence program storage unit 42 based on the identification information included in the first selection information, and displays, in the second display section 52, the second screen that is set for displaying the first sequence program.

Next, at step S40, a third display step is performed, which is a third display section display step by which a third screen display process is performed. In the third display step, a third screen is displayed in the third display section 53, the third screen being set for displaying a second sequence program stored in a second displayed PLC of the multiple PLCs 2.

That is, the program display control unit 26 selects the PLC 2 indicated by second selection information as the second displayed PLC that is a display target PLC 2 whose sequence program is displayed in the third display section 53, based on the second selection information transmitted from the display device selection unit 24 based on the operator's input of second designation information. For example, the second PLC 2B is selected as the second displayed PLC that is a display target whose sequence program is displayed in the third display section 53. The program display control unit 26 then acquires the second sequence program that is a sequence program of the second displayed PLC selected, from the sequence program storage unit 42 based on the identification information included in the second selection information, and displays, in the third display section 53, the third screen that is set for displaying the second sequence program.

Next, at step S50, a display time specification step is performed. In the display time specification step, the display time specification unit 27 acquires a specified time specified by the cursor 95, and transmits information on the specified time to the program display control unit 26.

Next, at step S60, a fourth display step is performed, which is the second display section display step by which a fourth screen display process is performed. In the fourth display step, the time-series data of the first displayed PLC corresponding to the specified time specified by the display time specification step is displayed on the first sequence program corresponding to the specified time having been displayed in the second display section 52.

That is, the program display control unit 26 causes the value of the first time-series data corresponding to the specified time to be reflected in the first sequence program that is currently displayed in the second display section 52. The program display control unit 26 acquires the time-series data 131 of the first displayed PLC selected based on the first selection information received from the display device selection unit 24, from the time-series data storage unit 41 based on the identification information included in the first selection information. The program display control unit 26 displays the value of the first time-series data corresponding to the specified time in the acquired time-series data, on the first sequence program that is currently displayed in the second display section 52.

In the example illustrated in FIG. 7, in the device value display section 97 for the first program 42A, a device value is displayed, which is a value of the first time-series data 131A at the specified time. In the device value display section 97, a value of the component device is displayed in accordance with a constituent element of the sequence program and a data type represented by the device. For example, in a case of a data register D0, the value of the component device is given by an integer value. In cases of an input device X0 and an output device Y0, the values of the devices are given by a black square and a white square, respectively.

Next, at step S70, a fifth display step is performed, which is the third display section display step by which a fifth screen display process is performed. In the fifth display step, the time-series data of the second displayed PLC corresponding to the specified time specified by the display time specification step is displayed on the second sequence program corresponding to the specified time displayed in the third display section 53.

In other words, the program display control unit 26 causes the value of the second time-series data corresponding to the specified time to be reflected in the second sequence program that is currently displayed in the third display section 53. The program display control unit 26 acquires the time-series data 131 of the second displayed PLC selected based on the second selection information received from the display device selection unit 24, from the time-series data storage unit 41 based on the identification information included in the second selection information. The program display control unit 26 makes control to display the value of the second time-series data corresponding to the specified time in the acquired time-series data, on the second sequence program being displayed in the third display section 53.

In the example illustrated in FIG. 8, in the device value display sections 97 for the second program 42B, a device value is displayed, which is a value of the second time-series data 131B at the specified time.

Performing the forgoing processes enables data at an arbitrary time in the time-series data collected from multiple PLCs 2 to be reflected in the sequence programs executed by the PLCs 2 displayed in the second display section 52 and the third display section 53. Then, by moving the cursor 95, the operator can reflect the value of the time-series data at a desired time in the sequence program.

This enables the operator to see waveforms of time-series data of the PLCs 2, the sequence programs, and the values of the time-series data reflected in the sequence programs, which are displayed on the display unit 50, thereby checking a change in the time-series data without the need to understand in advance how the sequence program executed by the PLC 2. That is, the device state reproduction system 100 enables efficient checking of each set of time-series data obtained during control of the multiple PLCs 2.

In addition, the device state reproduction system 100 is capable of simultaneously displaying, as illustrated in FIG. 6, the waveforms of device values of component devices that are multiple components described in the ladder program executed by the PLC 2. Moreover, as illustrated in FIGS. 7 and 8, the ladder programs executed by the PLC 2 are displayed. By so doing, the association between component devices on the ladder programs can be readily understood, thereby making it possible to efficiently check the time-series data together with the association between component devices.

The above-mentioned advantageous effects are particularly effective in checking time-series data in some case such as a case where control operations of servomotors 3 in multiple PLCs 2 are closely related to each other, or a case where multiple PLCs 2 send and receive data between them to control the multiple servomotors 3. That is, in the device state reproduction system 100, it is possible to readily and detailedly check a situation such as how the control by each of the PLCs 2 influences the control by the other PLCs 2, and how the FA device 8 has fallen into an abnormal state as a result of such an influence of the control of each PLC 2 on the other PLCs 2.

Therefore, the device state reproduction device 1 according to this first embodiment enables efficient and easy checking of a device value that is each piece of time-series data obtained during the control of the multiple PLCs 2.

Note that providing multiple ones of the first display section 51, of the second display section 52, and of the third display section 53 enables device values of a greater number of different PLCs 2 to be reflected and displayed in the sequence programs. This enables changes in time-series data of a greater number of PLCs 2 occurring at the same time to be concurrently checked on the sequence programs with respect to the PLCs 2 installed in a single FA device. As a result, it is possible to concurrently and easily check associations of the control states of the control target devices and the states of the control target devices in respective ones of a greater number of PLCs 2, thus leading to further improvement in convenience.

In addition, the foregoing description has focused on the case in which the device state reproduction device 1 collects time-series data directly from the multiple PLCs 2. The device state reproduction device 1 may collect time-series data that has been collected to another device from the multiple PLCs. For example, time-series data stored in the multiple PLCs 2 after it is transmitted from the PLCs 2 to a logging device may be transmitted from the logging device to the device state reproduction device 1.

Moreover, a servomotor having a sensor function may be used as the control target device, and in this case, the servomotor detects the state of operation of the servomotor with a predetermined period, and transmits the detection result to the PLC 2.

In addition, the control target device is not limited to a servomotor. Moreover, the control device is not limited to a PLC. Examples of multiple control devices other than PLCs include a motion unit for controlling a servomotor when the control target device is a servomotor. In addition, another example of the control device may be a servo amplifier for controlling a servomotor when the control target device is a servomotor. A further example of the control device may be a robot controller for controlling a robot when the control target device is a robot.

The device state reproduction device 1 may have a function of generating a sequence program and a function of editing a sequence program. With this configuration, it is possible to edit using the device state reproduction device 1 immediately after checking the control state of the control target device and the state of the control target device for each of the PLCs 2 using the device state reproduction device 1, thereby improving workability in editing the sequence program.

Figure 10:
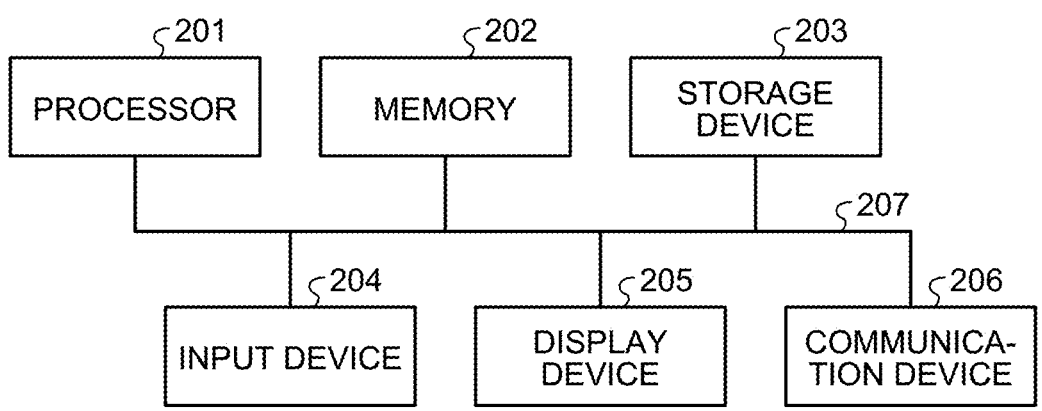
FIG. 10 is a diagram illustrating a hardware configuration in a case in which functions of the device state reproduction device according to the first embodiment of the present invention is implemented based on a computer system.

The device state reproduction device 1 according to this first embodiment is implemented by a computer system such as a personal computer or a general-purpose computer. FIG. 10 is a diagram illustrating a hardware configuration in a case in which the functionality of the device state reproduction device 1 according to the first embodiment of the present invention is implemented by a computer system. In a case in which the functionality of the device state reproduction device 1 is implemented by a computer system, the computer system for the device state reproduction device 1 includes, as illustrated in FIG. 10, a processor 201 that performs computation, a memory 202 used as a work area by the processor 201, a storage device 203 that stores a program for causing the computer system to operate as the device state reproduction device 1, an input device 204 that is an input interface between the system and the operator, a display device 205 that displays information toward the operator, and a communication device 206 having a function of communicating with a PLC and/or other various kinds of devices. The processor 201, the memory 202, the storage device 203, the input device 204, the display device 205, and the communication device 206 are connected to one another via a data bus 207. In this regard, the processor 201 may be a processing device, a computing device, a microprocessor, a microcomputer, a central processing unit (CPU), a digital signal processor (DSP), or the like.

In addition, the memory 202 may be: a non-volatile or volatile semiconductor memory such as a random access memory (RAM), a read-only memory (ROM), a flash memory, an erasable programmable ROM (EPROM), or an electrically EPROM (EEPROM) (registered trademark); a magnetic disk; a flexible disk; an optical disk; a compact disc; a MiniDisc; a digital versatile disc (DVD); or the like.

The control unit 20 is implemented by, for example, the processor 201 executing a program stored in the memory 202 illustrated in FIG. 10. In addition, the foregoing functions may be implemented by multiple processors and multiple memories in conjunction with each other. Part of the function for the control unit 20 may be implemented as an electronic circuit, and the remainder thereof may be implemented using the processor 201 and the memory 202.

Similarly, the communication unit 70 may also be implemented by the processor 201 executing a program stored in the memory 202. In addition, the foregoing functions may be implemented by multiple processors and multiple memories in conjunction with each other. Part of the function for the communication unit 70 may be implemented as an electronic circuit, and the remainder thereof may be implemented using the processor 201 and the memory 202. Moreover, the function for the communication unit 70 may be implemented by a processor and a memory that are the same as the processor and the memory that implement the control unit 20, or by a processor and a memory which are different therefrom.

The function of a device state reproduction method performed by the device state reproduction device 1 is implemented in software, firmware, or a combination of software and firmware. The software or firmware is described as a program or programs, and is stored in the storage device 203. The processor 201 reads the software or firmware stored in the storage device 203 into the memory 202, and executes the software or firmware, so as to provide various functions for the control unit 20 and the communication unit 70. That is, the computer system includes the storage device 203 for storing a device state reproduction program that causes steps of currying out the device state reproduction method according to the first embodiment to be resultantly executed when various kinds of functions for the control unit 20 and the communication unit 70 are performed by the processor 201.

In addition, the program or programs for implementing the function of the device state reproduction method performed by the device state reproduction device 1 can be provided via a communication medium, or may be provided in the form of a storage medium on which a program has been recorded. The storage medium on which the program for implementing the function of the device state reproduction method performed by the device state reproduction device 1 is recorded corresponds to a computer-readable storage medium in which a computer-executable program or programs are stored.

It can also be said that these programs cause a computer to perform processing by which various functions of the control unit 20 and of the communication unit 70 are implemented. Specific examples of the display device 205 include a monitor and a display. Specific examples of the input device 204 include a keyboard, a mouse, and a touch panel.

As described above, the device state reproduction device 1 according to this first embodiment can make efficient checking of each set of time-series data obtained during control of multiple control target devices.

The configurations described in the foregoing embodiment are merely examples of a content of the present invention, and can each be combined with other publicly known techniques and partially omitted and/or modified without departing from the scope of the present invention.

REFERENCE SIGNS LIST

1 device state reproduction device; 2 programmable logic controller; 2A first PLC; 2B second PLC; 3 servomotor; 3A first servomotor; 3B second servomotor; 4 sensor; 4A first sensor; 4B second sensor; 5, 6, 7 communication line; 8 FA device; 20 control unit; 21 data collection unit; 22 time-series data collection unit; 23 identification information collection unit; 24 display device selection unit; 25 waveform display control unit; 26 program display control unit; 27 display time specification unit; 40 storage unit; 41 time-series data storage unit; 41A first log file; 41B second log file; 41n n-th log file; 42 sequence program storage unit; 42A first sequence program; 42B second sequence program; 42n n-th sequence program; 50 display unit; 51 first display section; 52 second display section; 53 third display section; 54 information display section; 60 input unit; 70 communication unit; 81 PLC communication unit; 82 PLC storage unit; 83 device memory; 84 PLC control unit; 91, 96 device name display section; 92 device waveform display section; 93 device display section; 94 time axis; 95 cursor; 97 device value display section; 100 device state reproduction system; 131 time-series data; 131A first time-series data; 131B second time-series data; 131n n-th time-series data; 132 identification information; 132A first identification information; 132B second identification information; 132n n-th identification information; 201 processor; 202 memory; 203 storage device; 204 input device; 205 display device; 206 communication device; 207 data bus.

The invention claimed is:

1. A device state reproduction device comprising:
a time-series data storage memory to store, for each of two or more devices, two or more different sets of time-series data acquired from the devices, the time-series data being obtained during control of two or more different control target devices;
a sequence program storage memory to store two or more sequence programs stored in the devices;
a waveform display control circuit to perform a first screen display process of displaying, in a first display section, a first screen that displays first time-series data acquired from a first device of the two or more devices, of the two or more different sets of time-series data, in a form of a waveform along with a time axis;
a program display control circuit to control display in a second display section and in a third display section; and
a display time specification circuit to specify a time at an arbitrary position in the waveform, wherein
the program display control circuit performs:
a display process of displaying the first time-series data corresponding to a specified time specified by the display time specification circuit, on a first sequence program stored by the first device, the first sequence program having been displayed in the second display section; and
a display process of displaying second time-series data acquired from a second device of the two or more devices, corresponding to the specified time specified by the display time specification circuit, on a second sequence program stored by the second device, the second sequence program having been displayed in the third display section.

2. The device state reproduction device according to claim 1, wherein
the program display control circuit performs:
a second screen display process of displaying, in the second display section, a second screen that displays the first sequence program,
a third screen display process of displaying, in the third display section, a third screen that displays the second sequence program,
a fourth screen display process of displaying the first time-series data corresponding to the specified time, on the first sequence program corresponding to the specified time displayed in the second display section, and
a fifth screen display process of displaying the second time-series data corresponding to the specified time, on the second sequence program corresponding to the specified time displayed in the third display section.

3. The device state reproduction device according to claim 2, wherein
the program display control circuit repeats the fourth screen display process and the fifth screen display process each time the specified time is changed.

4. The device state reproduction device according to claim 2, comprising:
a multiple ones of the third display section, wherein
the program display control circuit performs the third screen display process and the fifth screen display process on multiple different ones of the second device.

5. The device state reproduction device according to claim 1, wherein
the two or more devices are different control devices to control operations of different control target devices,
the first time-series data is time-series data obtained when the first device controls the operation of a first control target device of the different control target devices according to the first sequence program, and
the second time-series data is time-series data obtained when the second device controls the operation of a second control target device of the different control target devices according to the second sequence program.

6. The device state reproduction device according to claim 5, wherein
the first time-series data includes device values of two or more component devices, the device values representing a state of the first control target device, each of the device values being updated according to an execution content when the first device executes the first sequence program, and
the second time-series data includes device values of two or more component devices, the device values representing a state of the second control target device, each of the device values being updated according to an execution content when the second device executes the second sequence program.

7. The device state reproduction device according to claim 1, wherein
the time-series data storage memory stores, for each of the devices, the time-series data acquired from each of the devices and identification information specific to the device with the time-series data being associated with the identification information,
the sequence program storage memory stores, for each of the devices, the sequence program stored by each of the devices and the identification information specific to the device with the time sequence program being associated with the identification information,
the waveform display control circuit and the program display control circuit select the first device from the two or more devices based on first selection information including the identification information of the first device, and
the program display control circuit selects the second device from the two or more devices based on second selection information including the identification information of the second device.

8. A device state reproduction method comprising:
a first display section display step of displaying, in a first display section, a first screen that displays first time-series data acquired from a first device of two or more devices, in a form of a waveform along with a time axis;
a display time specification step of specifying a time at an arbitrary position in the waveform;
a second display section display step of displaying the first time-series data corresponding to a specified time specified by the display time specification step, on a first sequence program stored by the first device, the first sequence program having been displayed in a second display section; and
a third display section display step of displaying second time-series data acquired from a second device of the two or more devices, corresponding to the specified time specified by the display time specification step, on a second sequence program stored by the second device, the second sequence program having been displayed in a third display section.

9. The device state reproduction method according to claim 8, wherein
the second display section display step includes:
a step of displaying, in the second display section, a second screen that displays the first sequence program; and
a step of displaying the first time-series data corresponding to the specified time on the first sequence program corresponding to the specified time, displayed in the second display section, and
the third display section display step includes:
a step of displaying, in the third display section, a third screen that displays the second sequence program; and
a step of displaying the second time-series data corresponding to the specified time on the second sequence program corresponding to the specified time, displayed in the third display section.

10. A non-transitory storage medium in which a device state reproduction program is stored, the device state reproduction program being configured to cause a computer to execute:
a first display section display step of displaying, in a first display section, a first screen that displays first time-series data acquired from a first device of two or more devices, in a form of a waveform along with a time axis;
a display time specification step of specifying a time at an arbitrary position in the waveform;
a second display section display step of displaying the first time-series data corresponding to a specified time specified by the display time specification step, on a first sequence program stored by the first device, the first sequence program having been displayed in a second display section; and
a third display section display step of displaying second time-series data acquired from a second device of the two or more devices, corresponding to the specified time specified by the display time specification step, on a second sequence program stored by the second device, the second sequence program having been displayed in a third display section.

11. The non-transitory storage medium according to claim 10, wherein
the second display section display step includes:
a step of displaying, in the second display section, a second screen that displays the first sequence program; and
a step of displaying the first time-series data corresponding to the specified time on the first sequence program corresponding to the specified time, displayed in the second display section, and
the third display section display step causes a computer to perform:
a step of displaying, in the third display section, a third screen that displays the second sequence program; and
a step of displaying the second time-series data corresponding to the specified time on the second sequence program corresponding to the specified time, displayed in the third display section.

* * * * *